US006727883B2

(12) United States Patent
Uno et al.

(10) Patent No.: US 6,727,883 B2
(45) Date of Patent: Apr. 27, 2004

(54) ELECTROPHORETIC DISPLAY DEVICE

(75) Inventors: Yoshinori Uno, Kanagawa (JP); Yojiro Matsuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 09/996,911

(22) Filed: Nov. 30, 2001

(65) Prior Publication Data

US 2002/0067333 A1 Jun. 6, 2002

(30) Foreign Application Priority Data

Dec. 1, 2000 (JP) ........................... 2000-367328
Jun. 26, 2001 (JP) ........................... 2001-193730

(51) Int. Cl.[7] ................................................ G09G 3/34
(52) U.S. Cl. .................. 345/107; 204/600; 359/296
(58) Field of Search ............................. 345/107, 84, 87, 345/88, 43, 694, 695, 696; 359/296; 204/450, 600

(56) References Cited

U.S. PATENT DOCUMENTS

| 3,612,758 | A |   | 10/1971 | Evans et al. ............. 178/5.4 R |
| 4,695,528 | A |   | 9/1987  | Dabisch et al. ............. 430/290 |
| 5,174,882 | A | * | 12/1992 | DiSanto et al. ............. 359/238 |
| 5,345,251 | A |   | 9/1994  | DiSanto et al. ............. 345/107 |
| 5,808,593 | A | * | 9/1998  | Sheridon ............. 345/84 |
| 6,525,865 | B2 | * | 2/2003 | Katase ............. 359/296 |
| 6,535,326 | B2 | * | 3/2003 | Uno ............. 359/296 |
| 2002/0180688 | A1 | * | 12/2002 | Drzaic et al. ............. 345/107 |
| 2003/0034950 | A1 | * | 2/2003 | Liang et al. ............. 345/107 |
| 2003/0035198 | A1 | * | 2/2003 | Liang et al. ............. 359/296 |

FOREIGN PATENT DOCUMENTS

| JP | 49-24695   | 3/1974  |
| JP | 55-154198  | 12/1980 |
| JP | 57-82086   | 5/1982  |
| JP | 59-171930  | 9/1984  |
| JP | 1-196094   | 8/1989  |
| JP | 8-507154   | 7/1996  |
| JP | 9-185087   | 7/1997  |
| JP | 11-202804  | 7/1999  |

* cited by examiner

Primary Examiner—Xiao Wu
(74) Attorney, Agent, or Firm—Fitzpatrick, Cella, Harper & Scinto

(57) ABSTRACT

In an electrophoretic display device, comprising: a pair of substrates opposing to each other with a gap therebetween, a spacer keeping the gap between the substrates to a predetermined extent, first electrodes and second electrodes disposed on either one of the substrates, an insulating liquid filling the gap between the substrates, and a plurality of charged electrophoretic particles carried in the insulating liquid, the plurality of charged electrophoretic particles being capable to move in response to a voltage applied between the first and second electrodes; the display region of the device is divided into pixels each having at least a pair of the first and the second electrodes, at least one of the first electrodes in a pixel, is disposed along and adjacent to the whole or a part of the boundary of the pixel, and the one of the first electrodes in a pixel and said one of the first electrodes in another pixel which are disposed adjacently to each other vita the pixel boundary have the same potential.

17 Claims, 12 Drawing Sheets

ELECTROPHORETIC DISPLAY DEVICE

BACKGROUND OF THE INVENTION

1. Field of the Invention

This invention relates to an electrophoretic display device, which performs display by moving charged electrophoretic particles.

2. Related Background Art

In recent years, with advancement of information machinery, the quantity of data of various information becomes larger and larger, and the information is outputted in various forms.

Methods of outputting information are commonly roughly grouped into:

(1) a method of performing display by means of display devices such as a CRT (cathode ray tube) and a liquid crystal display panel; and (2) a method of performing display by taking hard copies on paper using a printer or the like.

Among the display devices in the method (1), the liquid crystal display panel, is being spotlighted in recent years because of its characteristic features that it requires only a small power consumption and also can be thin-shaped. It, however, also has problems that characters displayed on its screen may be viewed with difficulty depending on angles at which you look at the screen or under the influence of reflected light and that the burden on eyesight which is caused by flickering, low luminance and so forth of its light source has not well been solved.

On the other hand, CRT is superior to the liquid crystal display panel in regard to contrast and luminance. However, in respect of the occurrence of flickering, it can not be said to have a sufficient display quality level compared with the hard-copy display in the method (2). It also has a problem that the display unit is so large and heavy as to have a very low portability.

The hard copies in the method (2) have at first been considered to become unnecessary with spread of display devices, but in fact they are frequently utilized. As reasons therefor, the following can be given. First, it can be pointed out that, in the case of display devices, not only the burden on eyesight has not well been solved as stated above, but also they have a low resolution (120 dpi at maximum), to which the hard copies have a superiority (300 dpi or higher). Second, it can be pointed out that, only the information displayed on the screen can be viewed in the case of display devices, whereas, in the case of the hard copies, a plurality of copies can be arranged to compare each other and can be rearranged without any complicate operation or can be checked in order. Third, it can be pointed out that the hard copies do not require any energy (power) for retaining the display, and are portable as long as the volume (i.e., the number of hard copies) is not so extremely large, making it possible to check the information anytime and anywhere.

As long as any motion picture display or frequent rewriting is not required, the hard copies still have a great advantage compared with display devices as stated above, but on the other hand have a problem that paper is consumed in a large quantity.

Accordingly, in recent years, development is energetically put forward on a rewritable recording medium (a medium on which sharp images can repeatedly be recorded and erased and which does riot require any energy for retaining the display). The third way of display which has succeeded the features of the hard copies and in which the display is rewritable. is herein called "paper like display".

Requirements for the paper like display are that the display is rewritable, that any energy is not required or sufficiently a low energy is enough to retain the display (memory performance), that the display has a good portability, that the display has a good quality level, and so forth. An example which, at present, can be regarded as a paper like display is the reversible display medium made from an organic low molecular and high molecular resin matrix system, which which is recorded and erased with a thermal printer head (e.g., Japanese Patent Applications Laid-Open No. 55-154198 and No. 57-82086). Such a medium is some utilized as a display part of a prepaid card, but has problems such that the contrast is not so high and the writing and erasing can only be repeated relatively as small as 150 to 500 times.

As another way of display which is expected to be utilized for the paper-like display, an electrophoretic display device invented by Harold. D. Lees et. al. is known (U.S. Pat. No. 3,612,758). Besides, Japanese Patent Application Laid-Open No. 9-185087 discloses an electrophoretic display device, The electrophoretic display device of this type has a pair of substrates disposed leaving a gap between them, an insulating liquid with which the gap between the substrates is filled, a large number of colored charged electrophoretic particles dispersed in the insulating liquid, and a pair of electrodes so disposed as to sandwich the insulating liquid between them. In such a device, with changes of the voltage polarity applied to the electrodes, the colored charged electrophoretic particles are attracted to the electrode on this side (viewer's side) or attracted to the electrode on the other side. When the colored charged electrophoretic particles are kept attracted to the electrode on this side, the color of the particles is perceived. When the colored charged electrophoretic particles are kept attracted to the electrode on the other side, the color of the insulating liquid is perceived. Thus, various images can be displayed by controlling the polarity of applied voltage for each pixel.

In such an electrophoretic display device, however, the colored charged electrophoretic particles are so made as to be freely movable from pixels to pixels, and hence there has been a problem that they can not be distributed in a uniform density, resulting in a poor display quality level.

As a device that can solve such a problem, Japanese Patent Applications Laid-Open No. 59-171930 and No. 01-196094 disclose a display device having a partition wall so disposed as to separate pixels from each other to block any unauthorized movement of colored charged electrophoretic particles.

Now, in the case of the electrophoretic display device of the type described above, a color-developing material (color-developing material such as a dye and ions) must be mixed in the insulating liquid for the purpose of coloring. However, this color-developing material may cause the delivering and receiving of electric charges with the electrophoretic particles, so that it may adversely affect the electrophoretic motion of the electrophoretic particles to lower the performance, lifetime and stability required as display devices.

As a device that can solve such a problem, Japanese Patent Applications Laid-Open No. 49-024695 and No. 11-202804 disclose an electrophoretic display device of a type shown in FIG. 13 (hereinafter "horizontal movement type electrophoretic display device"). Such a horizontal movement type electrophoretic display device has a pair of substrates $1a$ and $1b$ disposed leaving a gap between them, an insulating liquid 4 with which the gap between the substrates $1a$ and $1b$ is filled, a large number of colored charged electrophoretic particles 5 dispersed in the insulating liquid, and a pair of electrodes 66 and 67 disposed in each pixel A. The pair of electrodes 66 and 67, however, are not so disposed as to sandwich the insulating liquid 4 between them like the type described previously, but are so disposed as to be arranged on one substrate 1a. In the case of such a horizontal movement type electrophoretic display device, the insulating liquid 4 may be transparent and any color developing material need not be mixed. Hence, the problem as stated above can be avoided. Also, in this device, one electrode 66 (here a first electrode 66) is covered with a colored layer 8a having the same color (e.g., black color) as the charged electrophoretic particles 5, and the other electrode 67 (here a second electrode 67) is covered with a colored layer 8b having a different color (e.g., white color). The colored charged electrophoretic particles 5 move horizontally (in the direction parallel to the substrate) in accordance with the polarity of the voltage applied to the electrodes 66 and 67, and are attracted to the first electrode 66 or second electrode 67. When the colored charged electrophoretic particles are kept attracted to the first electrode 66, the color of the particles is readily perceived. When the colored charged electrophoretic particles 5 are kept attracted to the second electrode 67, the whole pixel is perceived in the same color as the charged electrophoretic particles 5. Thus, various images can be displayed by controlling the polarity of applied voltage for each pixel.

Now, in the horizontal movement type electrophoretic display device as described above, colored charged electrophoretic particles $5A_1$ disposed in a certain pixel $A_1$ are desired to be controlled only by the voltage applied to electrodes $66A_1$ and $67A_1$ of the pixel $A_1$. However, the colored charged electrophoretic particles $5A_1$ may move irregularly under the influence of an electric field of an adjoining pixel $A_2$ (i.e., the voltage applied to electrodes $66A_2$ and $67A_2$ of the pixel $A_2$) to cause a disorder of display and a decrease in contrast.

In the case of a method of performing display by forming electric field distribution in the horizontal direction (i.e., in the above horizontal movement type electrophoretic display device), like electrophoretic display intended in the present invention, various wirings and switching elements connected to electrodes and switching elements may partly stand uncovered in regions where any electrodes (display electrodes) are formed (e.g., the boundary region between the first electrode and the second electrode and the boundary region between pixels), and there has also been a serious problem that any leaked electric field the wirings and switching elements may cause makes the electrophoretic particles move in the vicinity of the wiring of display pixels, resulting in a poor display quality.

SUMMARY OF THE INVENTION

Accordingly, an object of the present invention is to provide an electrophoretic display device which prevents any deterioration of display quality stated above.

The present invention was made taking account of the above circumstances, and provides an electrophoretic display device, comprising:

a pair of substrates opposing to each other with a gap therebetween, a spacer keeping the gap between the substrates to a predetermined extent, first electrodes and second electrodes disposed on either one of the substrates, an insulating liquid filling the gap between the substrates, and a plurality of charged electrophoretic particles carried in the insulating liquid, the plurality of charged electrophoretic particles being capable to move in response to a voltage applied between the first and second electrodes, wherein, the display region of the device is divided into pixels each having at least a pair of the first and the second electrodes, at least one of the first electrodes in a pixel is disposed along and adjacent to the whole or a part of the boundary of the pixel, and the one of the first electrodes in a pixel and said one of the first electrodes in another pixel which are disposed adjacently to each other via the pixel, boundary have the same potential.

DESCRIPTION OF THE PREFERRED EMBODIMENTS

Figure 1:
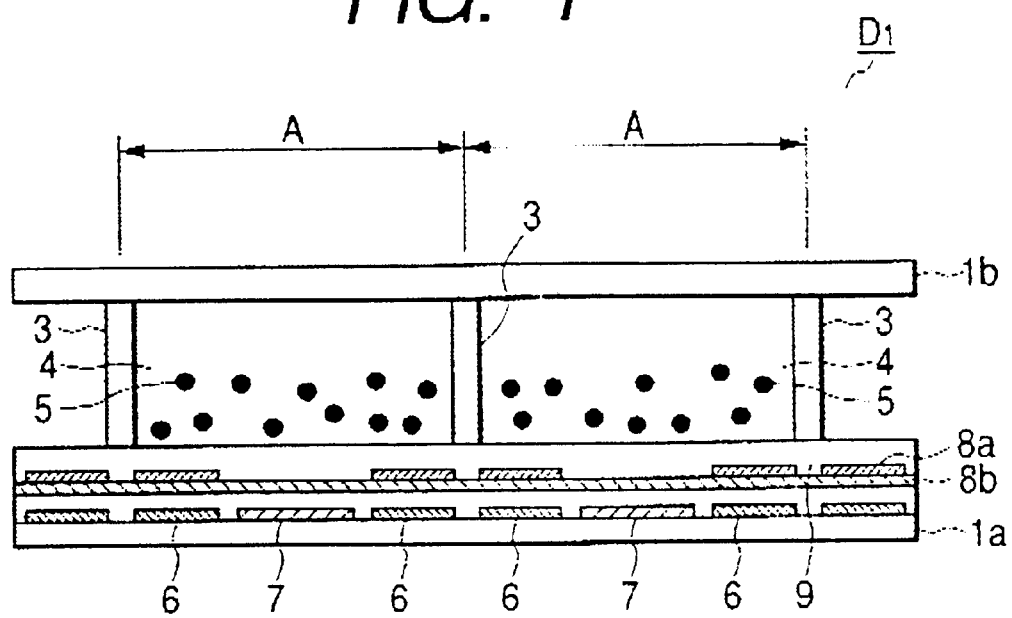
FIG. 1 is a cross sectional view showing an example of the structure of an electrophoretic display device according to the present invention.

Embodiments of the present invention are described below with reference to FIGS. 1 to 23A–23B.

The electrophoretic display device according to the present invention has, e.g., as shown by reference symbol $D_1$, a pair of substrates 1a and 1b disposed leaving a stated space between them, an insulating liquid 4 disposed at each pixel A, and a plurality of charged electrophoretic particles dispersed in the insulating liquid 4. Between the pair of substrates 1a and 1b, a space support is disposed, with which the space between the substrates is kept in a stated extent. The display device has a plurality of pixels which divide a display region Here, in each pixel A, a first electrode 6 and a second electrode 7 are disposed on and in parallel to either one of the substrates 1a and 1b (for the sake of convenience, hereinafter one substrate on which the first electrode 6 and second electrode 7 are disposed is called "first substrate 1a", and the other substrate, "second substrate 1b"), the two first electrodes 6 are disposed interposing a pixel boundary at least at a part of the pixel boundary and adjacently to each other on both sides of the pixel boundary. Thus, in respect of the two first electrodes 6 disposed interposing a pixel boundary, the first electrode 6 of one pixel and the first electrode 6 of the other pixel are disposed at a position where they are adjacent to each other in the vicinity of the pixel boundary, and these first electrodes 6 are so constructed as to be electrically connected to have the same potential. Namely, in one pixel and the other pixel which are disposed adjoiningly to each other, the respective first electrodes 6 are disposed adjacently to their pixel boundary (the boundary between pixels adjoining to each other). As a result, it follows that these two first electrode 6 are adjacently disposed interposing the pixel boundary. Such relationship may be applied to all the pixels of the display device, or may be applied to a part of the pixels. Also, these two first electrodes 6 disposed adjacently to each other may electrically be connected.

Making these electrodes have the same potential on the both sides of the pixel boundary can prevent a strong electric field from being produced between the pixels, and enable avoidance of the phenomenon that the electrophoretic particles move irregularly under the influence of an electric field of an adjoining pixel.

Figure 13:
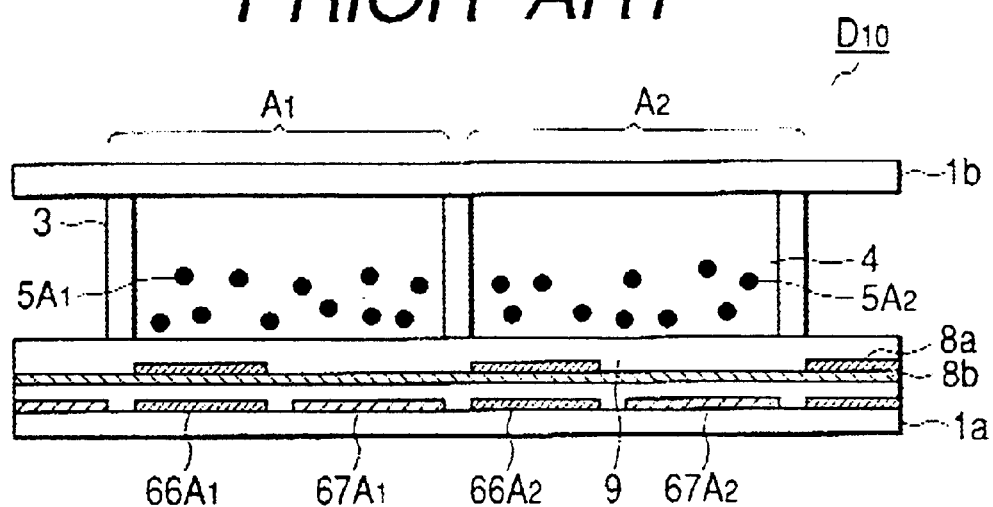
FIG. 13 is a cross sectional view showing an example of the structure of a conventional electrophoretic display device.

In the electrode structure shown in FIG. 13, when, the electrophoretic particles (assumed to be positively charged) in the pixel $A_1$ are intended to be moved from the surface of the electrode $66A_1$ to the surface of the electrode $67A_1$ without a change of display state in the pixel $A_2$, a potential of +50 V is applied to the electrode $66A_1$ and a potential of −50 V is applied to the electrode $67A_1$ and both the electrodes $66A_2$ and $67A_2$ are kept at a potential of 0 V. In such a case, the electrophoretic particles on the electrode $66A_1$ receives a force directed to tile electrode $67A_1$ at about ½ of the force received by electrophoretic particles on the electrode $67A_1$ and hence they move unwontedly in part toward the pixel $A_1$. Even if the electrodes in pixels whose display states are not changed are set to have the same potential 31 50 V as the electrode $67A_1$, this time a pixel on the side opposite to the pixel $A_1$ (not shown) is influenced. Whatever potential the electrodes are set to have the two electrodes interposing a pixel boundary assume different potential when the writing in white, the writing in black and the keeping of the display state are performed. Hence, the unwanted movement of electrophoretic particles necessarily takes place in that case.

On the other hand, in the case where the device has the electrode structure as shown in FIG. 1, the writing is performed setting the potential of the second electrode 7 at +50 V or −50 V, and the potential of the first electrode 6 can always be kept at 0 V. Even in such a case, a force may act on the electrophoretic particles to be kept standing in that pixel depending or, the voltage applied to the second electrode of an adjoining pixel. However, its magnitude is smaller than the force acting on the electrophoretic particles in the pixel which performs writing. Namely, when a potential of +50 V or −50 V is applied to the second electrode 7 of one pixel, the intensity of an electric field leaking to the adjoining pixel is always smaller than the electric field intensity in that pixel. Hence, setting the movement threshold value at a value intermediate between them, the electrode shape and the applied voltage can be designed so that the electrophoretic particles of the adjoining pixel, do not move.

As described above, the first electrode has the action to make smaller the electric field leaking to the adjoining pixel than the electric field in the pixel. For this end, it may preferably be disposed in parallel to the pixel boundary In a width having a stated distance to thereby make the second electrode set apart from the pixel boundary. In such disposition, the distance from the second electrode to an arbitrary position on the first electrode in that pixel is smaller than the distance therefrom to an arbitrary position on the first electrode in its adjoining pixel. Hence, the above condition that the electric field intensity in a pixel is greater than the intensity of an electric field leaking to the adjoining pixel is fulfilled. This condition may not be fulfilled at the corners of a pixel, but there is no problem in practical use as long as this condition is fulfilled in the greater part of a pixel.

The first electrode may be fixed to common potential in every pixel and the second electrode may be controlled for each pixel, thus a matrix display device can be materialized. For this end, not shown in FIG. 1, a switching element such as TFT or MIM may be provided for each pixel.

Figure 2:
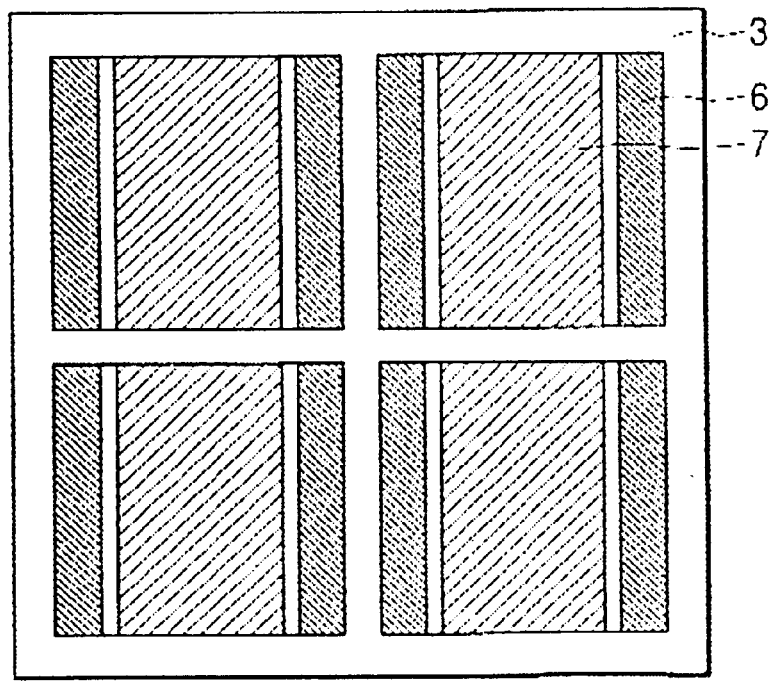
FIG. 2 is a plan view showing an example of the structure of the electrophoretic display device according to the present invention.

In general, the first electrode 6 and the second electrode 7 may be disposed at any position and may have any shape as long as the above condition is fulfilled (i.e., the condition that two first electrodes 6 are disposed interposing a pixel boundary at least at part of the pixel boundary and adjacently to each other on both sides of the pixel boundary and the electric field intensity in a pixel is greater than the intensity of an electric field leaking to the adjoining pixel). For example, as shown in FIG. 2, the first electrode 6 and the second electrode 7 may be disposed alternately in stripes. The side on which the first electrode is not disposed adjacently to the pixel boundary and the first electrode and second electrode are directly disposed adjacently to each other may be so designed that the distance between pixels is made larger or an auxiliary electrode described later may be provided between pixels so that the electric field leaking to the adjoining pixel can be weaker than the electric field in a pixel. When so designed and the first electrode is disposed only in one direction (the lateral direction in FIG. 2) of the matrix arrangement, the potential of the first electrode must be set to common potential in the lateral direction interposing the pixel boundary, which potential, however, may be different in the longitudinal direction. For example, the first electrodes may be connected in common in the lateral direction to provide a scanning line, and the second electrodes may be connected in common in the longitudinal direction to provide a signal line to make up a simple matrix drive system.

Figure 3:
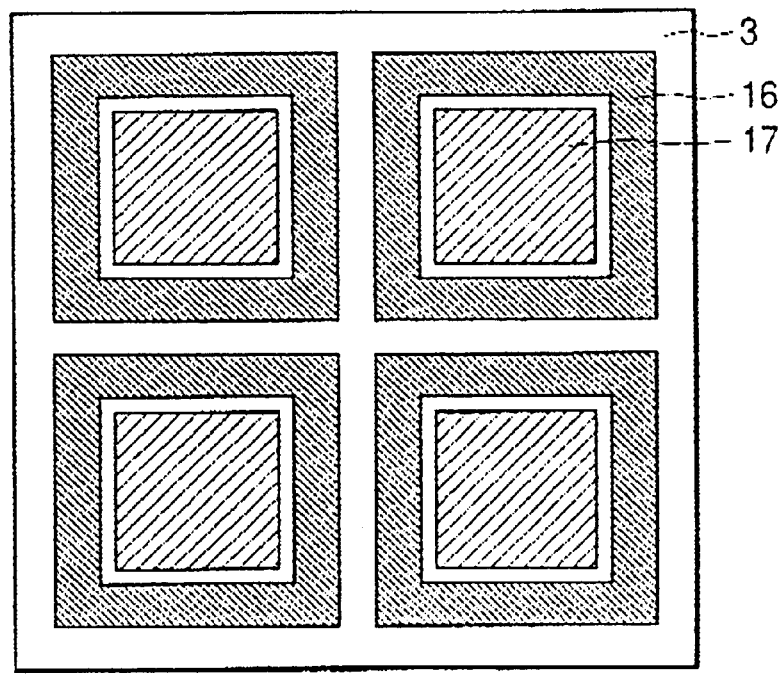
FIG. 3 is a plan view showing an example of the structure of the electrophoretic display device according to the present invention.

An example in which a first electrode 16 is so disposed in the form of a frame as to surround a second electrode 17 is shown in FIG. 3.

Here, the second electrode 17 shown in FIG. 3 is rectangular, but by no means limited thereto of course, and it may be circular for example. Also, the first electrode 16 shown in FIG. 3 is so disposed as to surround the four sides of the second electrode 17, but by no means limited thereto of course, and it may be so disposed as to surround the three sides of the second electrode 17.

Figure 4:
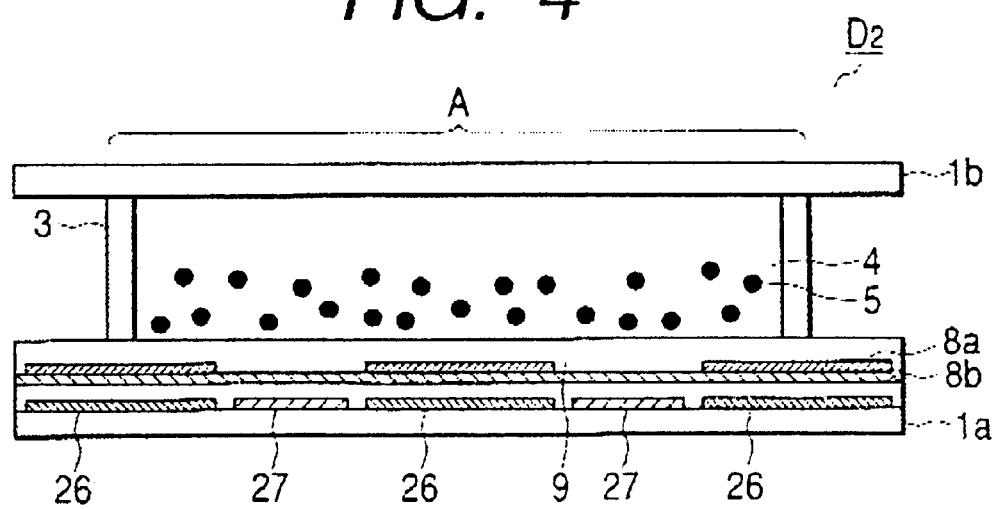
FIG. 4 is a cross sectional view showing an example of the structure of an electrophoretic display device according to the present invention.

In the example shown in FIGS. 1 and 2, two first electrode 6 are disposed in one pixel A and one second electrode 7 is disposed therein, but the example is by no means limited thereto. For example, as shown in FIG. 4, three first electrodes 26 may be disposed in one pixel A and two second electrodes 27 may be disposed therein. More electrodes may be disposed. When the electrodes 26 and 27 are disposed in a larger number, the charged electrophoretic particles can be made to move in a short distance, making it possible to form images at a high speed and uniformly.

In the electrophoretic display device $D_1$ shown in FIG. 1, the first electrodes 6 disposed in one pixel A and the first electrodes 6 disposed in the other pixel A are also formed separately from each other interposing each pixel boundary. These, however, are by no means limited thereto of course, and may integrally be formed as shown by reference numeral 26 in FIG. 4 or by reference numeral 36 in FIG. 5. Making the first electrodes integral in this way enables easy manufacture of display devices.

Figure 6:
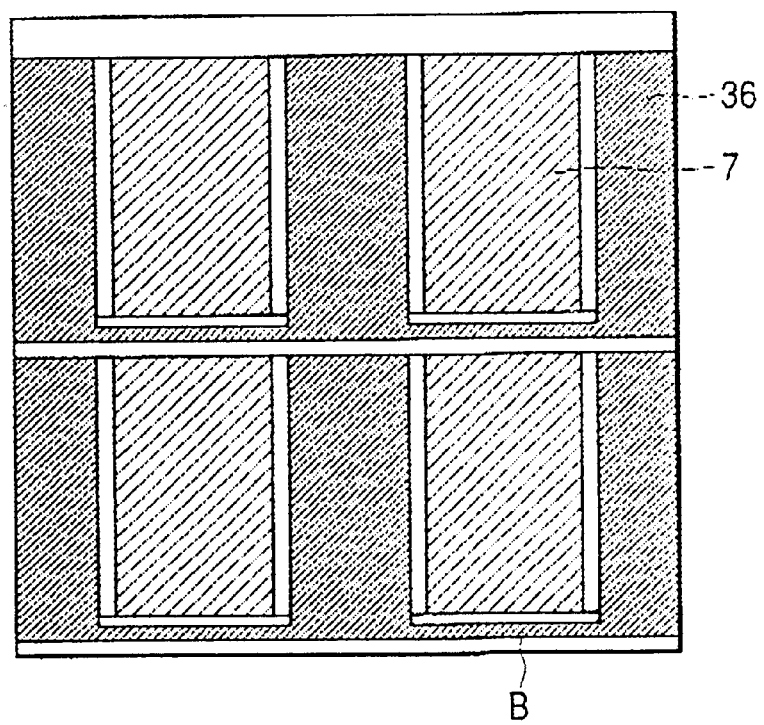
FIG. 6 is a plan view showing an example of the structure of the electrophoretic display device according to the present invention.
Figure 7:
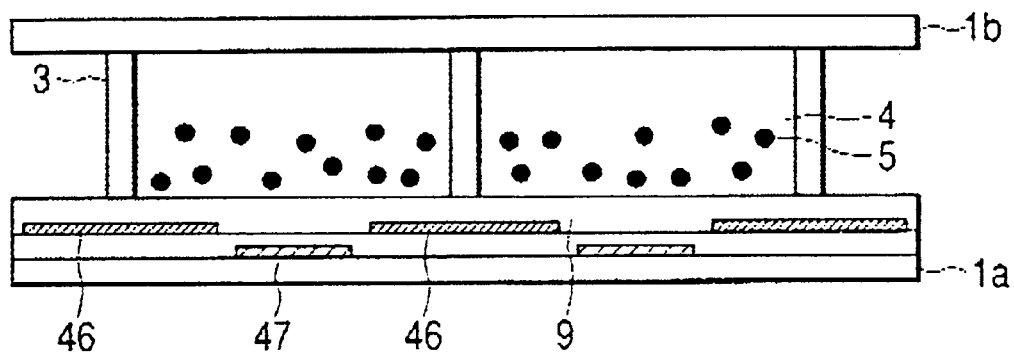
FIG. 7 is a cross sectional view showing an example of the structure of an electrophoretic display device according to the present invention.

Now, the first electrode disposed in plurality in one pixel A may also be so constructed that, as shown by reference symbol B in FIG. 6, as to be wire-connected to each other in the pixel and electrically bridged to have the same potential.

Figure 8:
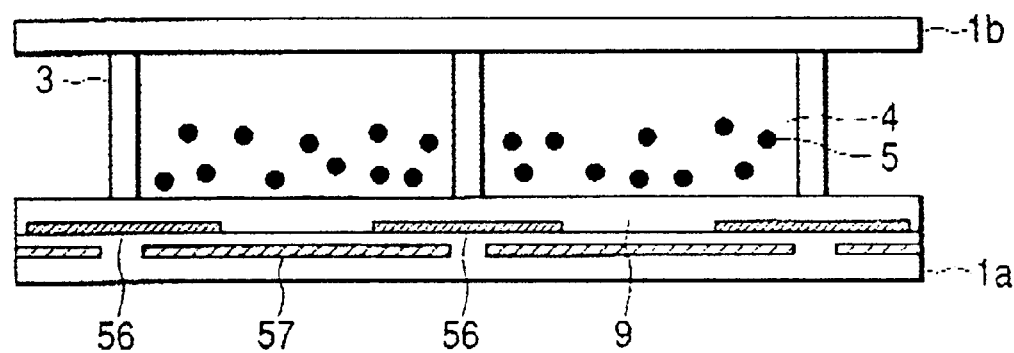
FIG. 8 is a cross sectional view showing an example of the structure of an electrophoretic display device according to the present invention.

In the examples shown in FIG. 1 and others, the first electrode 6 and the second electrode 7 are formed in the same height on the same plane. These, however, are also by no means limited thereto of course, and may be formed in different height on different planes as shown by reference numerals 46 and 47 ti FIG. 7. Here, in the example shown in FIG. 7, the first electrode 46 and the second electrode 47 are so disposed as not to overlap each other. However, as shown in FIG. 8, the electrodes may also be so disposed that first and second electrodes 56 and 57 overlap each other.

Figure 14:
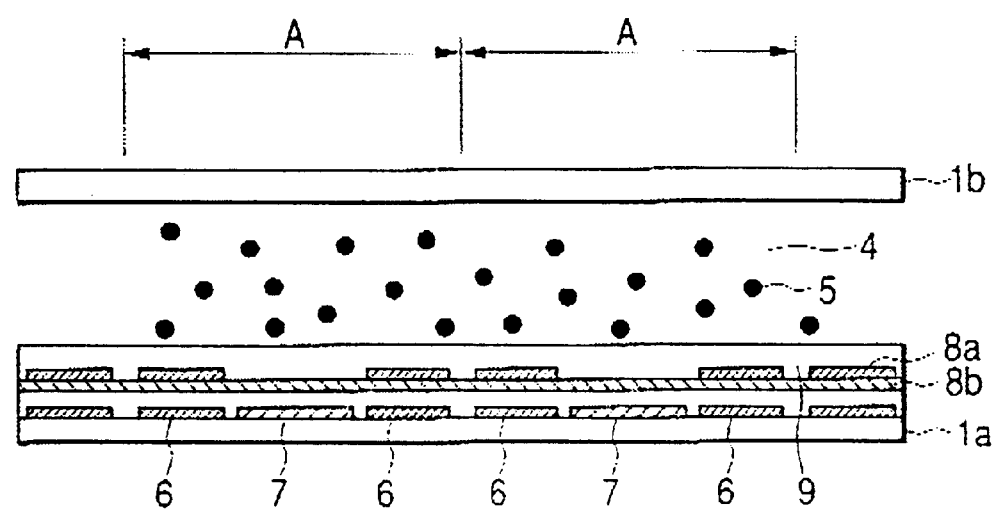
FIG. 14 is a cross sectional view showing an example of the structure of an electrophoretic display device according to the present invention.
Figure 15:
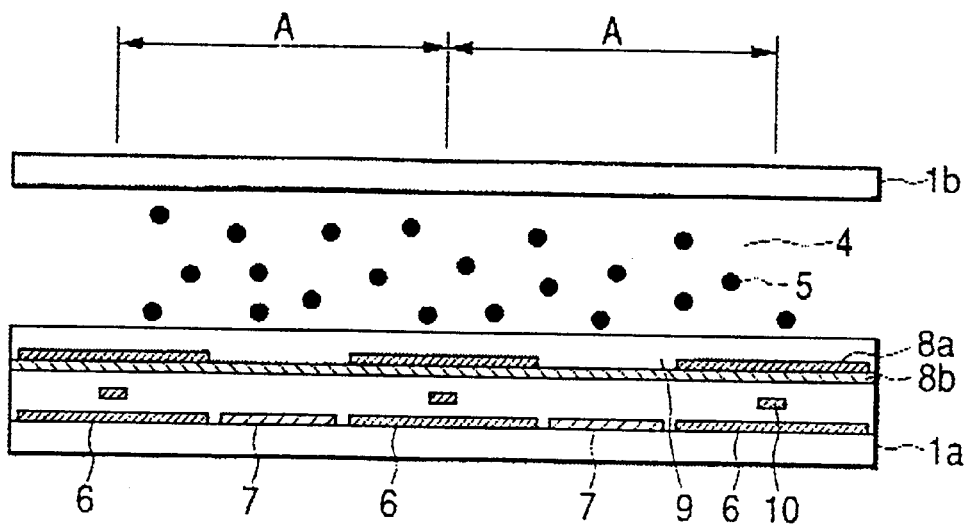
FIG. 15 is a cross sectional view showing an example of the structure of an electrophoretic display device according to the present invention.

In the examples shown in FIG. 1 and others, a partition wall 3 is further provided as a space support. However, a structure having no partition wall as shown in FIG. 14 is also feasible where the movement threshold value of electrophoretic particles and the electric field are properly set.

In addition, where any wirings and switching elements are connected to the first electrode and second electrode, these wirings and switching elements may preferably be disposed on the first substrate side (between the first electrode and the first substrate or between the second electrode and the first substrate) in such a way that they are covered with the first electrode face and/or second electrode face (any one or both electrode face(s) of the first electrode and second electrode) as viewed from the region in which the charged electrophoretic particles are present. With such construction, the influence on the driving of charged electrophoretic particles, of any leaked electric field caused by the wirings and switching elements can be lessened or removed on account of the effect of shielding that is attributable to the first and second electrodes. The electrodes (display electrodes) can be made to have the shielding effect without any additional shielding structure provided in order to shield the electric field having leaked from the wirings and switching elements. Thus, this can make device construction compact and device manufacture easier.

Figure 11:
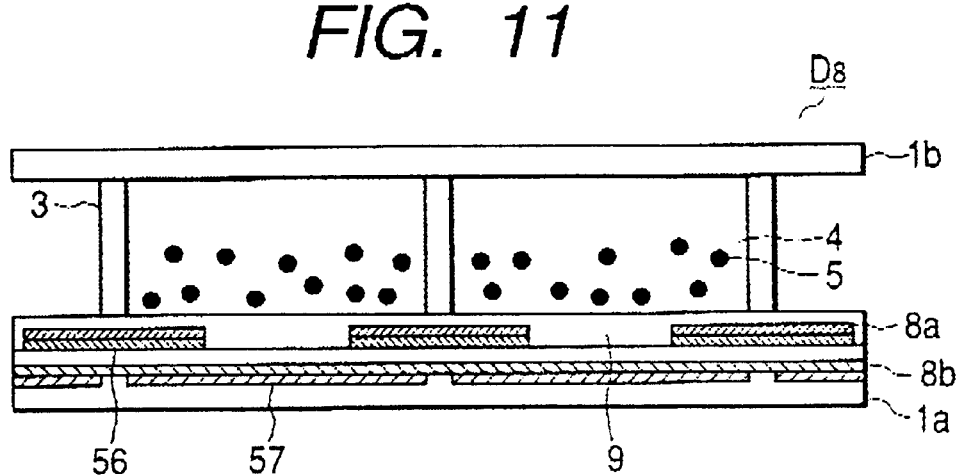
FIG. 11 is a cross sectional view showing an example of the structure of an electrophoretic display device according to the present invention.
Figure 22:
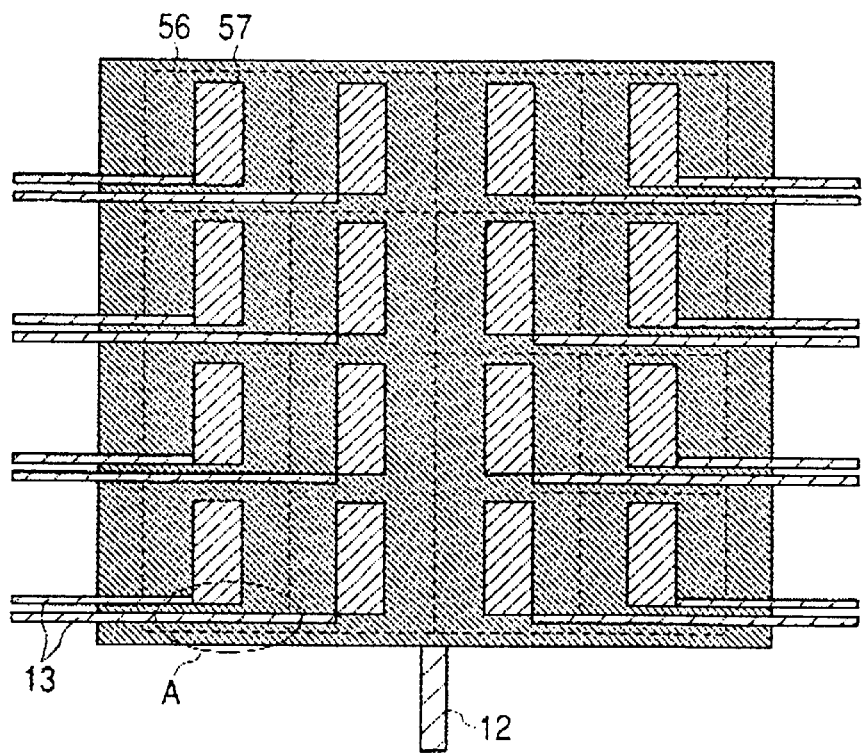
FIG. 22 is a plan view showing an example of the structure of the electrophoretic display device according to the present invention.

FIG. 22 is a plan view showing an electrophoretic display device shown in FIG. 11. First electrodes 56 are each integrally formed in all pixels, and are connected to a wiring 12. Also, second electrodes 57 are each rectangular and are connected to wirings 13. Here, the wirings 13 of the second electrodes 57 are each disposed at a position where the second electrode is covered with the first electrode. With such construction, any unwanted driving of charged electrophoretic particles (namely, display deterioration) which is caused by an electric field leaking from the wiring 13 can be prevented on account of the shielding effect attributable to the first electrode. In a conventional electrode structure as disclosed in, e.g., Japanese Patent Application Laid-Open No. 8-507154, the shielding of lead wires for feeding a voltage to electrodes is not taken into account. However, the double layer construction of electrodes as in the present invention makes it possible to shield the lead wires for one electrode with the other electrode.

Figure 23A:
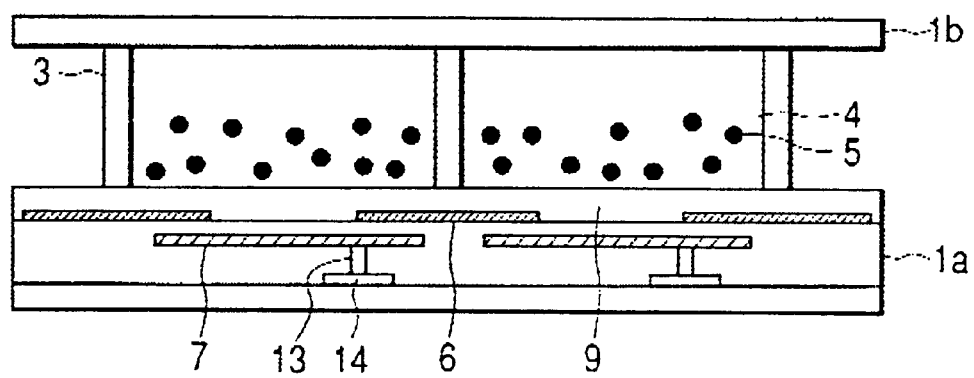
FIGS. 23A and 23B are a cross sectional view and a plan view, respectively, showing an example of the structure of an electrophoretic display device according to the present invention.
Figure 23B:
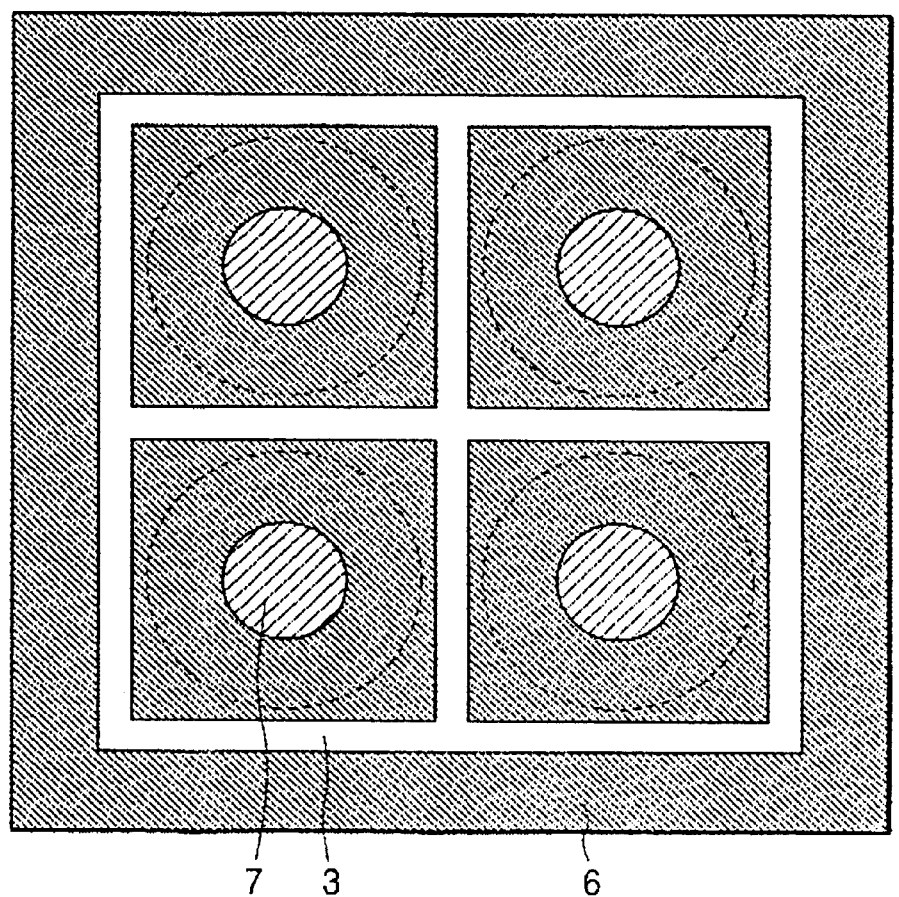

As further shown in FIG. 23A, FIG. 23B being a plan view, the first electrode 6 and the second electrode 7 may be formed in different height on different planes and also may be so formed that the end portions of the respective electrodes 6 and 7 overlap each other at the boundary between the first electrode 6 and the second electrode 7. With such construction, the electric field leaking from the wiring 13 and switching element 14, which leaks from the boundary between the first electrode 6 and the second electrode 7, can more perfectly be shielded. Also, the tolerance of any pattern deviation of the first electrode 6 and second electrode 7 at the time of manufacture can be made larger.

In construction such that only one electrode (display electrode) is formed on one substrate, it has been difficult to suppress any display deterioration being caused by the electric field leaking from wirings and switching elements at openings between electrodes disposed in a matrix. However, in the electrophoretic display device disclosed herein as the present invention, the two electrodes first electrode and second electrode are disposed in parallel to one substrate and these two electrode faces are effectively used. Thus, it has become possible to perfectly shield the electric field leaking from wirings and switching elements at the boundaries between electrodes and boundaries between pixels.

Figure 9:
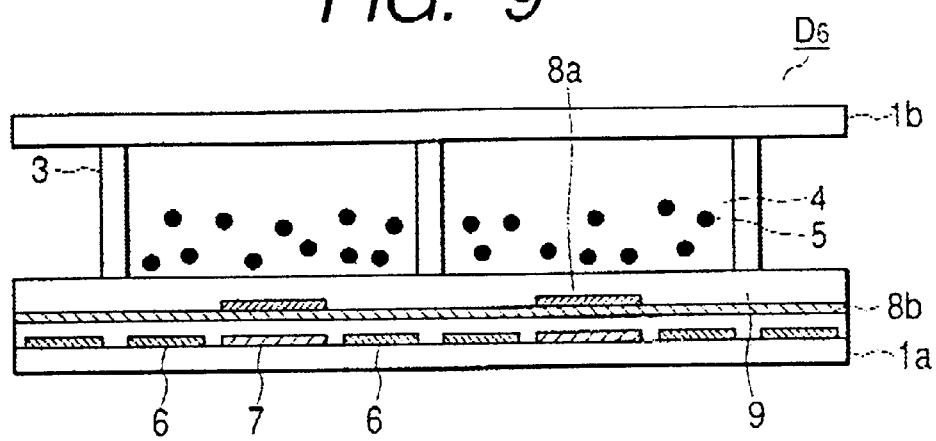
FIG. 9 is a cross sectional view showing an example of the structure of an electrophoretic display device according to the present invention.
Figure 10:
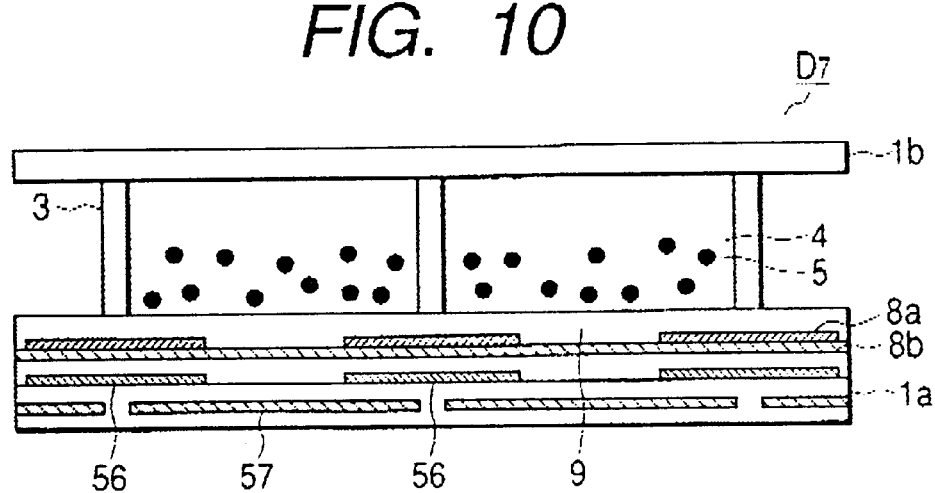
FIG. 10 is a cross sectional view showing an example of the structure of an electrophoretic display device according to the present invention.

Now, of the first electrode 6 and second electrode 7 described above, any one electrode may be colored in the same color as the charged electrophoretic particles 5 and the other electrode may be colored in different color. For example;

in FIG. 1, the charged electrophoretic particles 5 may be colored in black, the first electrode 6 in black, and the second electrode 7 in white; or in FIG. 9, the charged electrophoretic particles 5 may be colored in black, the first electrode 6 in white, and the second electrode 7 in black. Of course, the coloring is by no means limited to these, and may freely be in any color combination. Also, when color display is intended, the charged electrophoretic particles 5 may be colored in black, one electrode of the first and second electrodes in black, and the other electrode in red, green or blue appropriately.

Figure 12:
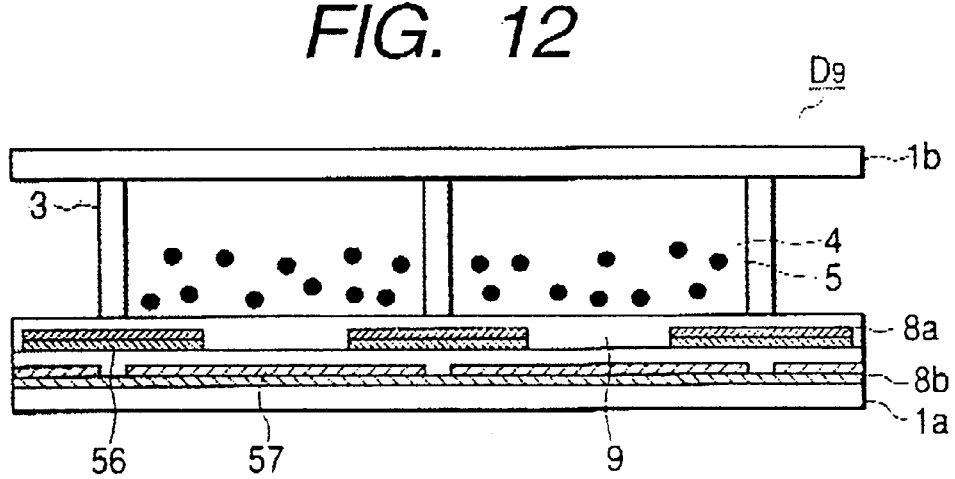
FIG. 12 is a cross sectional view showing an example of the structure of an electrophoretic display device according to the present invention.

As methods of coloring the electrodes;

the electrodes themselves may be colored; or colored layers shown by reference numerals 8a and 8b in FIG. 1 may be provided in addition to the electrodes. Either may be employed. Here, the reference numeral 8a denotes a colored layer which covers the first electrode 6, and the reference numeral 8b denotes a colored layer which covers the second electrode 6. In an example shown in FIG. 10, these colored layers 8a and 8b are both so disposed as to be closer to the viewer's side than the both electrodes, a first electrode 56 and a second electrode 57. Of course, their disposition is by no means limited to these. As shown in FIG. 11, one colored layer 8a may be so disposed as to cover the first electrode 56, and the other colored layer 8b to cover the second electrode 57. Also, when the first electrode or the second electrode is set transparent, the colored layers may be disposed not on the viewer's side but on the opposite side. FIG. 12 shows an example thereof, where the second electrode 57 is set transparent, and its colored layer 8b is disposed beneath the second electrode 57. In place of a colored layer, a reflecting layer may be disposed.

Here, in the case where the electrodes themselves are colored as mentioned above;

the colors of electrode materials themselves may be utilized; or the colors of materials themselves for surface insulating layers formed on the electrodes may be utilized.

Figure 16:
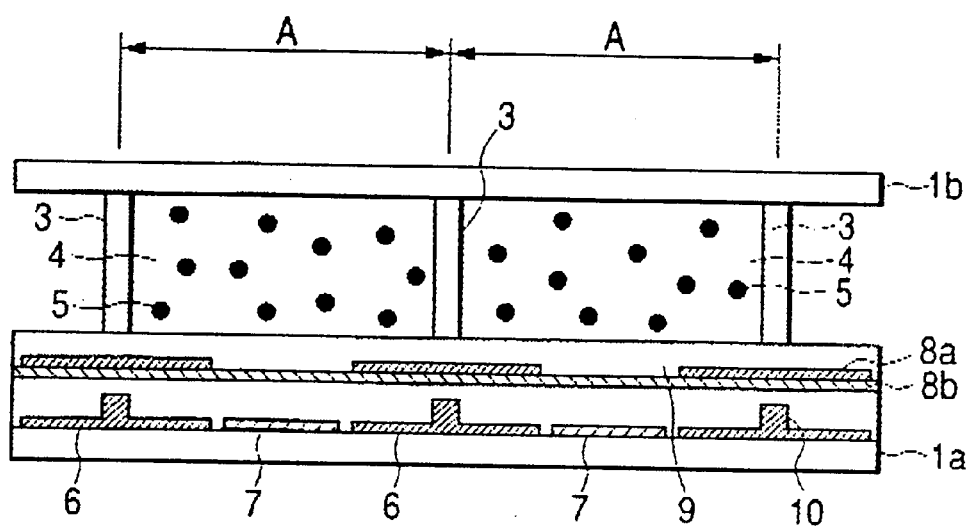
FIG. 16 is a cross sectional view showing an example of the structure of an electrophoretic display device according to the present invention.
Figure 17:
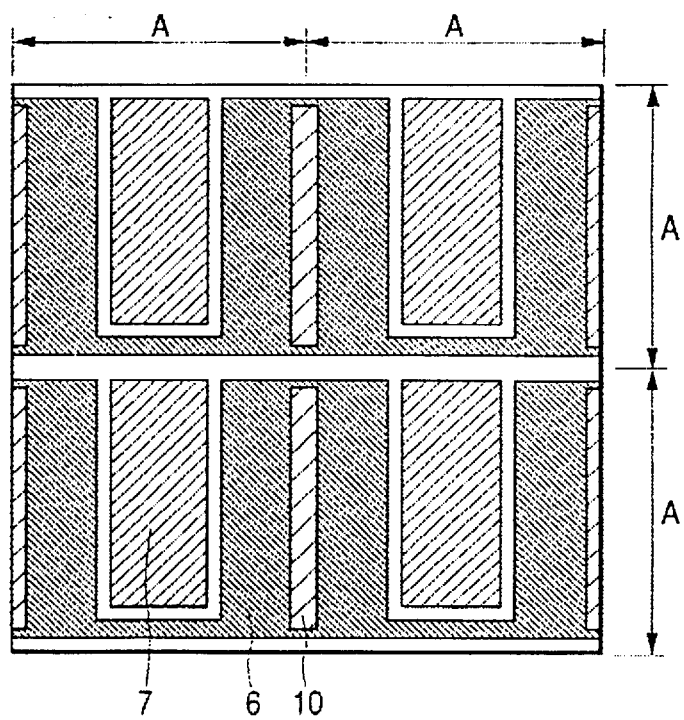
FIG. 17 is a plan view showing an example of the structure of the electrophoretic display device according to the present invention.
Figure 18:
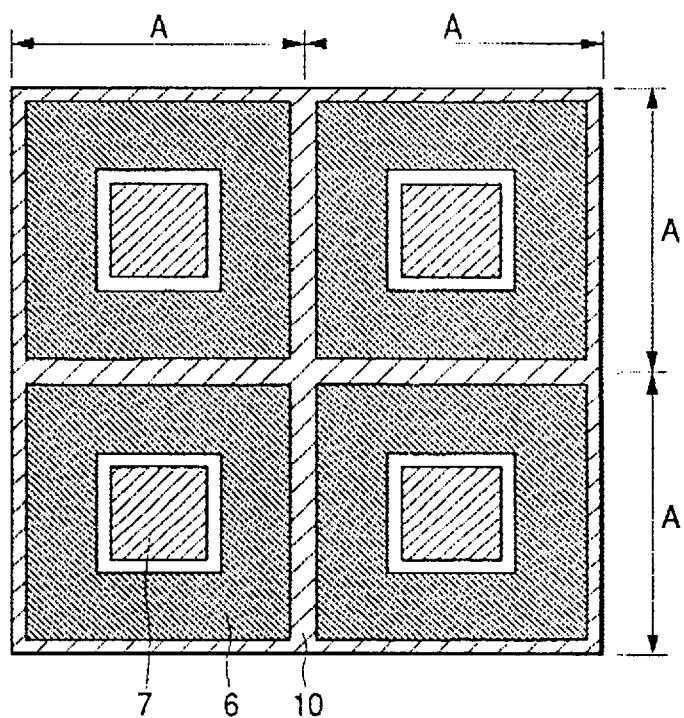
FIG. 18 is a plan view showing an example of the structure of the electrophoretic display device according to the present invention.

An auxiliary electrode 10 to be set to the same potential as the potential of the first electrode 6 may also be provided (FIGS. 15, 16, 17, 18 and 19) on an area including the position where the absolute value of the horizontal component of electric field vectors produced above the first electrode 6 assumes a minimum value when a drive voltage of an equal potential different from the potential of the first electrode 6 is applied to the respective second electrodes 7 of adjoining pixels. The auxiliary electrode 10 may be an electrode disposed on the first electrode 6 via an insulating layer, or the first electrode 6 has a protrusion structure and the protrusion structure may be made to serve as the auxiliary electrode 10 (FIG. 16). In either case, the auxiliary electrode 10 may have an additional electrode structure on the second substrate 1b side of the first substrate 1a at a place conditioning as stated above (the area including the position where the absolute value of the horizontal component of electric field vectors produced above the first electrode 6 assumes a minimum value when a drive voltage of an equal potential different from the potential of the first electrode 6 is applied to the respective second electrodes 7 of adjoining pixels). Providing the auxiliary electrode 10 brings about the effect of improving the movement of charged electrophoretic particles 5 in a region having a weak electric field produced. Moreover, it brings about the effect of lessening the influence of drive voltage of one pixel on any pixel adjoining to that pixel. Especially when pixels adjoining to each other differ in drive voltage, it brings about the effect of making small any voltage variations at the position where the absolute value of the horizontal component of electric field vectors produced above the first electrode 6 assumes a minimum value when a drive voltage of an equal potential different from the potential of the first electrode 6 is applied to the respective second electrodes 7 of adjoining pixels. This brings about the effect of making the display quality level stable.

Figure 19:
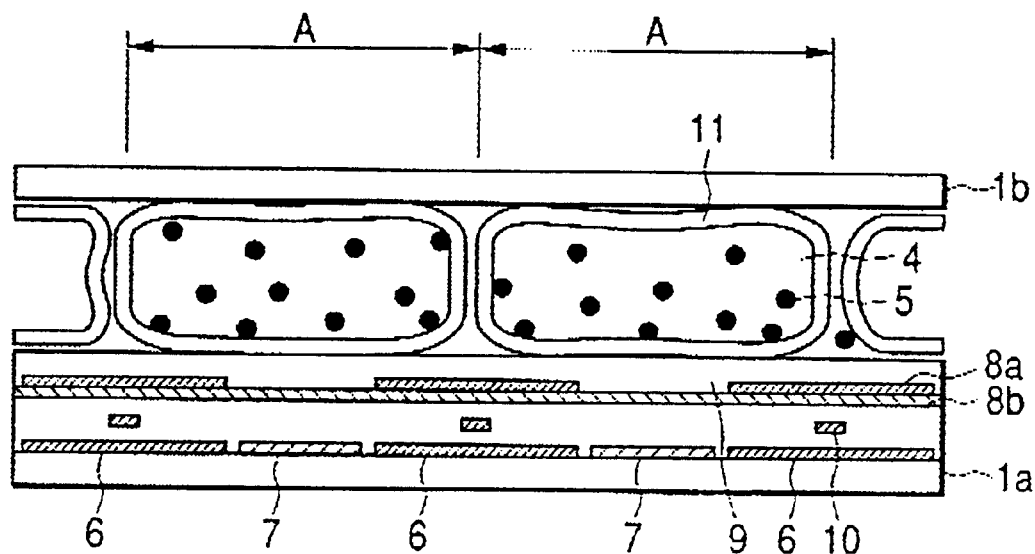
FIG. 19 is a cross sectional view showing an example of the structure of an electrophoretic display device according to the present invention.
Figure 20:
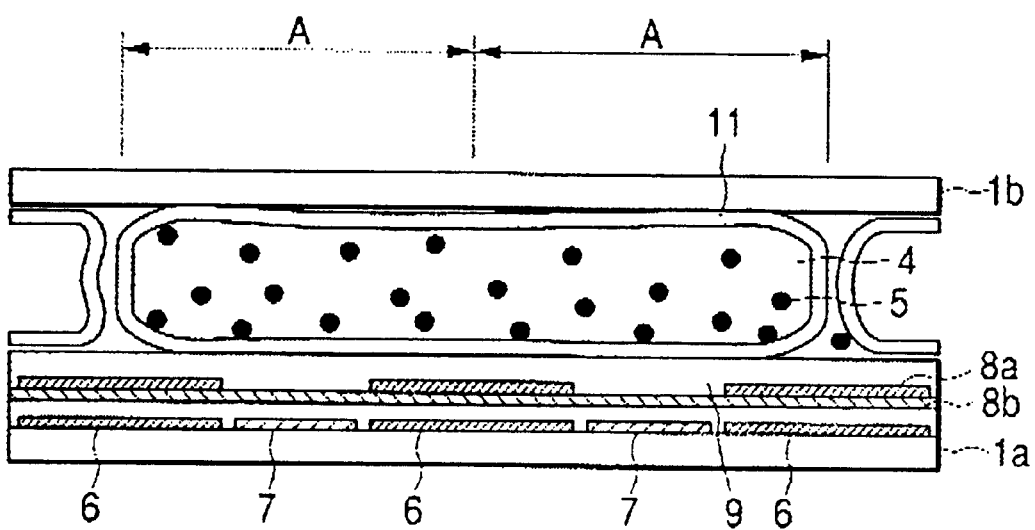
FIG. 20 is a cross sectional view showing an example of the structure of an electrophoretic display device according to the present invention.

The insulating liquid 4 and the charged electrophoretic particles 5 may also be encapsulated into a transparent film microcapsule 11 and the resultant microcapsule 11 may be disposed between the first substrate 1a and the second substrate 1b (FIG. 19). The use of such a microcapsule 11 makes it unnecessary to form the partition wall 3. There are no particular limitations on the size of the microcapsule 11. It may preferably be a certain measure of uniform size large enough to cover each pixel region. Also, construction making use of a microcapsule 11 having such a size that it can cover a plurality of pixels is one of preferred construction (FIG. 20).

As for the first substrate 1a and second substrate 1b, usable are polymer films such as polyethylene terephthalate (PET) film and polyether sulfone (PES) film and insulating materials such as glass and quartz.

The electrodes 6, 7, 16, 17, 26, 27, 36, 37, 46, 47, 56 and 57 and the auxiliary electrode 10 may also be formed using any materials as long as they are conductive materials capable of being patterned.

An insulating layer 9 may further be so formed as to cover the electrode 6 and so forth and the auxiliary electrode 10. In the case where the insulating layer is formed, electric charges can be prevented from being infected from the electrode 6 and so forth into the charged electrophoretic particles 5. As materials used for this insulating layer 9, preferred are materials causative of formation of pinholes with difficulty and having a low dielectric constant; stated specifically, amorphous fluorine resins, high transparency polyimides, and PET. It may also preferably have a film thickness of about 1 $\mu$m or smaller.

As the insulating liquid 5, a colorless transparent liquid such as silicone oil, toluene, xylene or high purity petroleum may be used.

As the charged electrophoretic particles 5, a material capable of showing good charge characteristics in the insulating liquid may be used. For example, a resin such as polyethylene or polystyrene may be used. When they are colored in black, carbon or the like may be mixed in the resin. With regard to the particle diameter of the charged electrophoretic particles, there are no particular limitations. Usually, those having particle diameters of from about 0.5 $\mu$mm to about 10 $\mu$m may be used.

As to the planar shape of pixels (the shape of pixels as viewed from a viewer, in other words, the shape of each division the partition walls 3 form), each pixel may have any shape as long as the charged electrophoretic particles 5 can be prevented from localizing (or moving across pixels). It is rectangular in the examples shown in FIG. 2 and so forth, but may be hexagonal or any other polygonal, With regard to the first electrode, second electrode and partition wall, their occupied area In one pixel may be in a ratio of:

first electrode : second electrode : partition wall=30:60:10

Typically stated, one pixel A is about 100 μm×100 μm in size, the charged electrophoretic particles 5 are 3 μm in particle diameter, and the space between substrates is about 50 μm.

In the partition wall 3, a polymer resin may be used. As methods of forming the partition wall 3, usable are:
- a method in which a photosensitive resin layer is formed on one substrate by coating followed by exposure and wet process development;
- a method in which partition walls are formed by printing; and
- a method in which partition walls are previously formed on the surface of a light transmissive first is substrate by molding.

As a material used for the microcapsule, it may include, e.g., gelatin, polyvinyl acetate, ethyl cellulose, nitro cellulose, polystyrene, polyethylene, polypropylene. epoxy resins, acrylic resins, methacrylic resins, nylon, polyester, polycarbonate, polyvinyl chloride, polyvinyl alcohol and sodium alginate. Also, as methods for its formation, known methods such as phase separation and polymerization may be used.

The present embodiments are effective as stated below.

According to the present embodiments, in respect of the two pixels A adjoining to each other interposing the pixel boundary, the first electrode 6 of one pixel and the first electrode 6 of the other pixel are disposed at a position they are adjacent to each other in the vicinity of the pixel boundary, and these first electrodes 6 are so constructed as to be electrically connected to have the same potential. Hence, the colored charged electrophoretic particles 5 disposed in each pixel A are controlled only by the voltage applied to the electrodes of that pixel A, without being influenced by the voltage applied to the electrodes of the other pixel A. As a result, any display disorder and decrease in contrast can be made to less occur.

Figure 5:
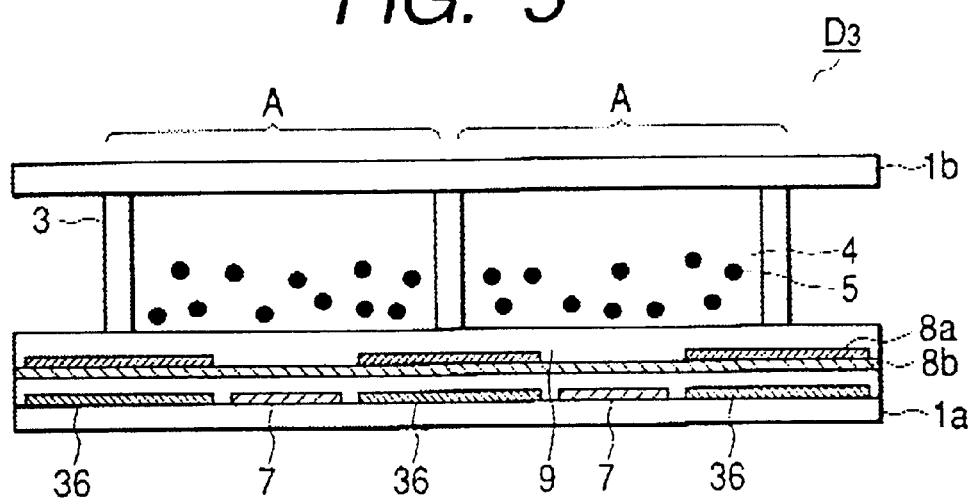
FIG. 5 is a cross sectional view showing an example of the structure of an electrophoretic display device according to the present invention.

According to the present embodiments, the partition wall 3 is also provided, and hence the electrophoretic particles 5 can be prevented from localizing (or moving from one pixel to the other pixel), thus the display quality level is improved, In the case where not the first electrodes 6 are formed separately for each pixel but the first electrode 36 is integrally formed for two pixels A as shown in FIG. 5 or 6, display devices can be manufactured with ease.

In the case where three or more first electrodes and two or more second electrodes are alternately disposed, the charged electrophoretic particles 5 can be made to move in a short distance, making it possible to form images at a high speed and uniformly.

In the case where the insulating layer 9 is so formed as to cover the electrode 6 and so forth, electric charges can be prevented from being injected from the electrode 6 and so forth into the charged electrophoretic particles 5.

In the case where the auxiliary electrode 10 is provided, the influence of drive voltage of one pixel on any pixel adjoining to that pixel A can be lessened to bring about an improvement in display quality level.

In the case where the insulating liquid 4 and the charged electrophoretic particles 5 are disposed in the state they are encapsulated into the microcapsule 11, the charged electrophoretic particles 5 can be prevented from localizing (or moving from one pixel to the other pixel), thus the display quality level is improved.

In the case where the wirings and switching elements are so disposed as to be covered with the first electrode face or second electrode face as viewed from the region in which the charged electrophoretic particles are present, the influence on the driving of charged electrophoretic particles, of any leaked electric field caused by the wirings and switching elements can be lessened or removed on account of the shielding effect attributable to the first and second electrodes.

In the case where the first electrode 6 and the second electrode 7 are formed on vertically shifted different planes so as to have different heights from the substrate and also so formed that the edge portions of the respective electrodes 6 and 7 overlap each other at the boundary between the first electrode 6 and the second electrode 7 (see FIG. 23A), the electric field leaking from the wiring 13 and switching element 14, which leaks from the boundary between the first electrode 6 and the second electrode 7, can more perfectly be shielded. Also, the tolerance of any pattern deviation of the first electrode 6 and second electrode 7 at the time of manufacture can be made larger.

The present invention is described below in greater detail by giving Examples.

Example 1

In this Example, the electrophoretic display device $D_1$ having the structure shown in FIGS. 1 and 2 was produced.

In this device $D_1$, each pixel A was formed in a size of 100 μm×100 μm, and the occupied area of the first electrodes 6 (for the two), the occupied area of the second electrode 7 and the occupied area of the partition wall 3 in each pixel A were set in a ratio of 30(15×2):60:10.

When this electrophoretic display device $D_1$, was produced, an aluminum thin film was formed on a PET film (200 μm thick) as the first substrate 1a, and was patterned by photolithography or wet etching to form the first electrodes 6 and second electrode 7 in stripes and also to form wiring to connect the two first electrodes 6. Then, a white colored layer 8b was so formed as to cover these electrodes 6 and 7, and a black colored layer 8a was so formed as to cover each first electrode 6. Here, the white colored layer 8b was formed using an acrylic resin having a white pigment such as alumina powder dispersed therein.

Next, an insulating layer 9 comprised of an acrylic resin was so formed as to cover these colored layers 8a and 8b.

Thereafter, the surface of this insulating layer 9 was coated with a photosensitive epoxy resin, followed by exposure and wet process development to form partition walls 3. The partition walls 3 were each 50 μm in height.

At this stage, the second substrate 1b was not still bonded, and hence a large number of depressions were formed by the first substrate 1a and the partition walls 3. Then these depressions were filled with silicone oil 4 as the insulating liquid and black charged electrophoretic particles 5. Here, a mixture of polystyrene with carbon was used to prepare the black charged electrophoretic particles 5, having an average particle diameter of about 2 μm. The particles 5 showed positive charge polarity in the silicone oil.

Next, a heat fusible adhesive layer pattern was formed on the first substrate 1a at its areas to be bonded to the second substrate 1b, and the second substrate 1b was placed on the partition walls of the first substrate 1a under registration, followed by application of heat to bond them together. A voltage application circuit (not shown) was connected thereto to produce the display device $D_1$.

The electrophoretic display device $D_1$ thus produced was driven. Stated specifically, an applied voltage Vd1 to the first electrode 6 was kept at 0 V, and an applied voltage Vd2 to the second electrode at +50 or −50 V, where the voltage polarity was reversed at intervals of 100 msec.

According to this Example, good black and white display was obtained.

Also when black and white different display was performed in adjoining pixels, any variations of contrast were not seen, making sure that stable display contrast was obtainable.

Example 2

In this Example, the electrophoretic display device $D_3$ having the structure shown in FIG. 5 was produced.

In this device $D_3$, each pixel A was formed in a size of 100 μm×100 μm, and the occupied area of the first electrodes 36, the occupied area of the second electrode 7 and the occupied area of the partition wall 3 in each pixel A were set in a ratio of 40:60:10.

When this electrophoretic display device $D_3$ was produced, an aluminum thin film was formed on a PET film (200 μm thick) as the first substrate 1a, and was patterned by photolithography or dry etching to form the first electrodes 36, second electrodes 7 and wirings B in the shapes shown in FIG. 6. Then, a white colored layer 8b was so formed as to cover these electrodes 36 and 7, and a black colored layer 8a was so formed as to cover each first electrode 36. Here, the white colored layer 8b was formed using an acrylic resin having a white pigment such as alumina powder dispersed therein.

Next, an insulating layer 9 comprised of an acrylic resin was so formed as to cover these colored layers 8a and 8b.

Thereafter, in the same manner as in Example 1, partition walls 3 were formed, the depressions were filled with silicone oil 4 and black charged electrophoretic particles 5, and the second substrate 1b was bonded.

Then, the electrophoretic display device was driven in the same manner as in Example 1 As a result, the like effect was obtained.

Example 3

In this Example, the electrophoretic display device $D_8$ having the structure shown in FIG. 11 was produced. A plan view of the device in this Example is also shown in FIG. 22.

In this device $D_8$, each pixel A was formed in a size of 100 μm×100 μm, and the occupied area of the first electrodes 56, the occupied area of the second electrode 57 and the occupied area of the partition wall 3 in each pixel A were set in a ratio of 30:70:10.

When this electrophoretic display device $D_8$ was produced, an aluminum thin film was formed on a PET film (200 μm thick) as the first substrate 1a, and was patterned by photolithography or dry etching to form the rectangular first electrodes 56, and second electrodes 57 in such a way that it covered the whole display area other than the first electrodes. The wiring 12 for connecting the first electrodes and the wirings 13 for connecting the second electrodes wore further formed; the wirings 13 being each disposed at a position where the second electrode is covered width the first electrode (see FIG. 22).

Then, in the same manner as in Example 1, the colored layers 8a and 8b, insulating layer 9 and partition walls 3 were formed, the depressions were filled with silicone oil 4 and black charged electrophoretic particles 5, and the second substrate 1b was bonded.

The electrophoretic display device thus produced was driven in the same manner as in Example 1.

According to this Example, good black-and-white display was obtained.

Also when black and white different display was performed in adjoining pixels, any variations of contrast were not seen, making sure that stable display contrast was obtainable.

Moreover, any display deterioration due to the electric field leaking from wirings and so forth was not seen at all.

Comparative Example

Figure 21:
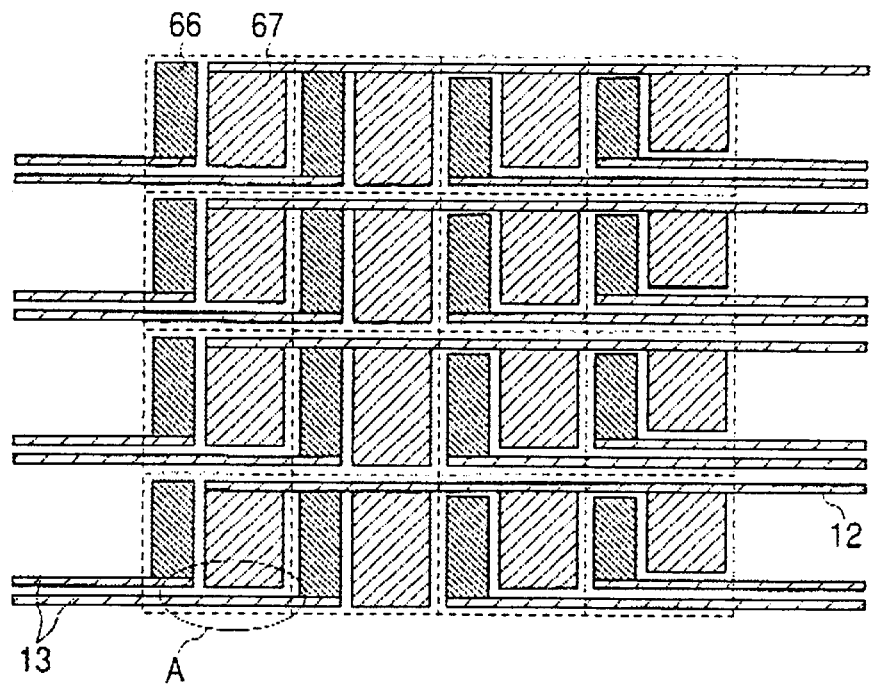
FIG. 21 is a plan view showing an example of the structure of the conventional electrophoretic display device.

In this Comparative Example, the electrophoretic display device shown in FIG. 13 was produced. A plan view of the device in this Comparative Example is also shown in FIG. 21. The device produced was driven in the same manner as in Example 1. As a result, cases were seen in which the display was disordered in some pixels because the electrophoretic particles 5 were influenced by the drive voltage of adjoining pixels. Also when black and white different display was performed in adjoining pixels, cases were seen in which the display was disordered in some pixels because the electrophoretic particles were influenced by the drive voltage of adjoining pixels. Cases were also seen in which the display was disordered in some pixels because the electrophoretic particles were influenced by the electric field leaking from wirings (e.g., at the part of region A shown in FIG. 21).

As described above, according to the present invention, in respect of the two pixels adjoining to each other interposing the pixel boundary, the first electrode of one pixel and the first electrode of the other pixel are disposed at a position they are adjacent to each other in the vicinity of the pixel boundary, and these first electrodes are so constructed as to be electrically connected to have the same potential. Hence, the colored charged electrophoretic particles disposed in each pixel A are controlled only by the voltage applied to the electrodes of that pixel A, without being influenced by the voltage applied to the electrodes of the other pixel A. As a result, any display disorder and decrease in contrast can be made to less occur.

According to the present invention, the partition wall is also provided in the manner described previously, and hence the electrophoretic particles can be prevented from localizing (or moving from one pixel to the other pixel), thus the display quality level is improved.

In the case where not the first electrodes are formed separately for each pixel but the first electrode is integrally formed in one body for two pixels, display devices can be manufactured with ease In the case where three or more first electrodes and two or more second electrodes are alternately disposed, the charged electrophoretic particles can be made to move in a short distance, making it possible to form images at a high speed and uniformly In the case where the insulating layer is so formed as to cover the electrodes and so forth, electric charges can be prevented from being injected from the electrodes into the charged electrophoretic particles.

In the case where the wirings and switching elements are so disposed as to be covered with the first electrode face or second electrode face as viewed from the region in which the charged electrophoretic particles are present, the influence on the driving of charged electrophoretic particles, of any leaked electric field caused by the wirings and switching elements can be lessened or removed on account of the shielding effect attributable to the first and second electrodes.

In the case where the first electrode and the second electrode are formed in different height on different planes and also so formed that the end portions of the respective electrodes overlap each other at the boundary between the first electrode and the second electrode, the electric field leaking from the wiring and switching element, which leaks from the boundary between the first electrode and the second electrode, can more perfectly be shielded. Also, the tolerance of any pattern deviation of the first electrode and second electrode at the time of manufacture can be made larger.

What is claimed is:

1. An electrophoretic display device, comprising:
    a pair of substrates opposed to each other with a gap therebetween,
    a spacer keeping the gap between the substrates to a predetermined extent,
    first electrodes and second electrodes disposed on either one of the substrates,
    an insulating liquid filling the gap between the substrates, and
    a plurality of charged electrophoretic particles carried in the insulating liquid,
    the plurality of charged electrophoretic particles being capable to move in response to a voltage applied between the first and second electrodes; wherein,
        the display region of the device is divided into pixels each having at least a pair of the first and the second electrodes, at least one of the first electrodes in a pixel is disposed along and adjacent to the whole or a part of the boundary of the pixel, and
        said one of the first electrodes in a pixel and said one of the first electrodes in another pixel which are disposed adjacent to each other via the pixel boundary are electrically connected together to have the same potential.

2. The electrophoretic display device according to claim 1, wherein the first electrodes are disposed in parallel to at least part of the pixel boundary and in a constant width.

3. The electrophoretic display device according to claim 1, wherein the first electrode potential is fixed and the second electrode potential is applied independently for each pixel, to cause the charged electrophoretic particles to move to perform display.

4. The electrophoretic display device according to claim 1, wherein the first electrodes are connected in common in the row direction and second electrodes are connected in common in the column direction to set a voltage for each pixel through the first and the second electrodes, to cause the charged electrophoretic particles to move to perform display.

5. The electrophoretic display device according to claim 1, wherein each pixel is provided therein with at least one second electrode and first electrodes so disposed as to surround the second electrode.

6. The electrophoretic display device according to claim 1, wherein the first electrode of one pixel and the first electrode of the other pixel which are disposed adjacently to each other are integrally formed.

7. The electrophoretic display device according to claim 1, wherein a plurality of first electrodes are provided in each pixel and are electrically connected to each other.

8. The electrophoretic display device according to claim 7, wherein at least three first electrodes and at least two second electrodes are alternately disposed in each pixel.

9. The electrophoretic display device according to claim 1, wherein the first electrode and the second electrode are formed on different planes so as to have different heights from the substrate.

10. The electrophoretic display device according to claim 1, wherein an auxiliary electrode connected electrically to the first electrode is disposed on an area including the position where the absolute value of the horizontal component of electric field vectors produced above the first electrode assumes a minimum value when a drive voltage of an equal potential different from the potential of the first electrode is applied to the respective second electrodes of adjoining pixels.

11. The electrophoretic display device according to claim 10, wherein the auxiliary electrode is disposed on the first electrode via an insulating layer.

12. The electrophoretic display device according to claim 10, wherein the auxiliary electrode is a protrusion structure provided on the first electrode.

13. The electrophoretic display device according to claim 1, wherein an insulating layer is so disposed as to cover the first electrode and the second electrode.

14. The electrophoretic display device according to claim 1, wherein a partition wall is provided at the pixel boundary to restrict the charged electrophoretic particles from movement across said boundary.

15. The electrophoretic display device according to claim 1, wherein a microcapsule which encapsulates the insulating liquid and the charged electrophoretic particles within a transparent film is disposed between the pair of substrates.

16. The electrophoretic display device according to claim 1, wherein wirings or switching elements, or both thereof, are connected to the first electrode and second electrodes, are shielded with any one or both electrode face(s) of the first electrode and second electrode, and are disposed at a position not having any electrical influence on the region in which the charged electrophoretic particles are present.

17. The electrophoretic display device according to claim 1, wherein the first electrode and the second electrode are formed on different, vertically shifted planes, and are so formed that the edge portions of the respective electrodes overlap each other at the boundary between the first electrode and the second electrode.

* * * * *

UNITED STATES PATENT AND TRADEMARK OFFICE
CERTIFICATE OF CORRECTION

PATENT NO. : 6,727,883 B2
DATED : April 27, 2004
INVENTOR(S) : Yoshinori Uno et al.

It is certified that error appears in the above-identified patent and that said Letters Patent is hereby corrected as shown below:

Title page,
Item [57], ABSTRACT,
Line 13, "pixel," should read -- pixel --; and
Line 17, "vita" should read -- via --.

Column 1,
Line 64, "riot" should read -- not --.

Column 2,
Line 2, "any energy is not" should read -- no energy is --; and
Line 12, "some" should read -- sometimes --.

Column 5,
Line 58, "electrode 6" should read -- electrodes 6 --.

Column 6,
Line 17, "31 50V" should read -- 50V --; and
Line 31, "or," should read -- on --.

Column 7,
Line 35, "electrode" should read -- electrodes --
Line 56, "constructed that," should read -- constructed, --;
Line 62, "arc" should read -- are --; and
Line 65, "ti" should read -- in --.

Column 11,
Line 4, "In" should read -- in --;
Line 5, "30:60:10" should read -- 30:60:10. --;
Line 19, "is" should be deleted;
Line 33, "they" should be deleted;
Line 34, "are" should be deleted; and
Line 42, "made to less occur." should read -- reduced. --.

Column 13,
Line 61, "wore" should read -- were --; and
Line 63, "width" should read -- with --.

UNITED STATES PATENT AND TRADEMARK OFFICE
CERTIFICATE OF CORRECTION

PATENT NO. : 6,727,883 B2
DATED : April 27, 2004
INVENTOR(S) : Yoshinori Uno et al.

It is certified that error appears in the above-identified patent and that said Letters Patent is hereby corrected as shown below:

<u>Column 14,</u>
Line 36, "they are" should be deleted;
Line 44, "made to less occur." should read -- reduced. --;
Line 54, "ease" should read -- ease. --; and
Line 59, "uniformly" should read -- uniformly. --.

Signed and Sealed this

Twenty-eighth Day of September, 2004

JON W. DUDAS
*Director of the United States Patent and Trademark Office*